Figure 1:
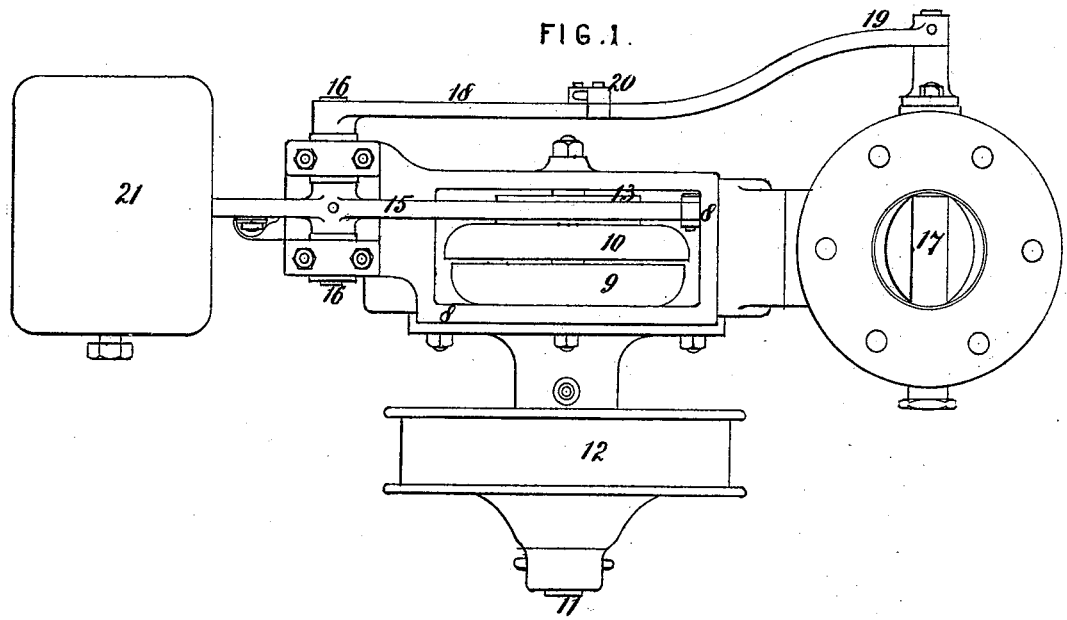

(No Model.) 2 Sheets—Sheet 1.

R. D. NAPIER.
GOVERNOR OR SPEED REGULATOR.

No. 307,975. Patented Nov. 11, 1884.

Witnesses:
John M. Clayton
Harry Drury

Inventor:
Robert D. Napier
by his Attorneys
Howson & Sons (No Model.) 2 Sheets—Sheet 2.

R. D. NAPIER.
GOVERNOR OR SPEED REGULATOR.

No. 307,975. Patented Nov. 11, 1884.

Witnesses:
John M. Clayton
Harry Drury

Inventor:
Robert D. Napier
by his Attorneys
Howson & Sons

UNITED STATES PATENT OFFICE.

ROBERT DAVID NAPIER, OF GLASGOW, COUNTY OF LANARK, SCOTLAND.

GOVERNOR OR SPEED-REGULATOR.

SPECIFICATION forming part of Letters Patent No. 307,975, dated November 11, 1884.

Application filed September 8, 1884. (No model.) Patented in England February 18, 1880, No. 718.

*To all whom it may concern:*

Be it known that I, ROBERT DAVID NAPIER, a subject of the Queen of Great Britain and Ireland, and a resident of Glasgow, county of Lanark, Scotland, have invented certain Improvements in Governors or Speed-Regulators, (for which I have obtained a patent in Great Britain, dated February 18, 1880, No. 718,) of which the following is a specification.

The said invention has for its object to improve the construction and action of governors or speed-regulators of the kind in which the operation of rotating blades on a liquid is employed.

Governors made with the improvements are comparatively small and inexpensive, and while having a sensitive and powerful corrective action, although arranged to act on a throttle-valve or other regulating-valve without the intervention of any extraneous force, are not subject to objectionable oscillation.

In carrying out the invention a shaft of the prime mover, or one suitably driven therefrom, and which may be in a horizontal or other convenient position, has fixed on it a disk having a series of blades fixed or formed on one of its faces. Loose on the same shaft there is a second disk, also having blades fixed or formed on one of its faces, and the two disks are placed with their bladed sides facing each other, and so that the blades of the rotating disk just clear those of the loose disk. The shaft passes through a stuffing-box into a box which contains the disks and water or other liquid. The loose disk has a pulley or barrel formed or fixed on its outer face, and a chain attached to this pulley or barrel transmits the action to the throttle-valve or other regulating-valve; or a pinion and rack or other equivalent may be substituted for the pulley and chain. When the shaft rotates, (which it does always in the same direction,) the action of the blades of the rotating disk on the liquid makes it tend to impart rotation to the loose disk by acting on the blades of the latter. This tendency to make the loose disk rotate is, however, resisted by a counter-weight or equivalent applied to the chain, or to a lever connected to the chain, and this counter-weight is adjusted so as to just balance the rotating tendency of the loose disk when the shaft is going at its proper speed. When the proper speed is exceeded, the resistance of the counter-weight is overcome, and when the speed is too low the counter-weight acts in the opposite direction, there taking place in either case a movement of the loose disk and of the throttle-valve or other regulating-valve. The blades of the rotating disk are by preference curved, with concavities facing forward in the direction of rotation, and the blades of the loose disk are curved, with concavities facing in the opposite direction, the object being to impart a maximum or considerable rotating tendency to the loose disk. And in order that the said invention and the manner of performing the same may be properly understood there is hereunto appended two sheets of explanatory drawings, to be hereinafter referred to, and representing a governor as made with the improvements.

In these drawings the same reference-numerals are used to mark the same or like parts wherever they are repeated.

Figure 2:
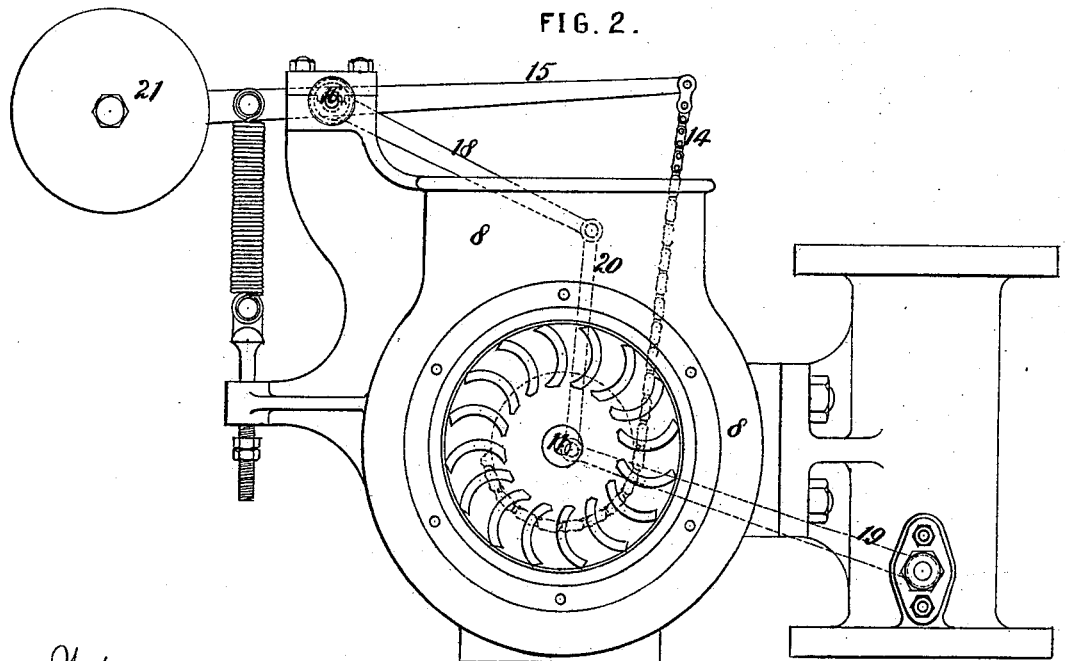
Figure 4:
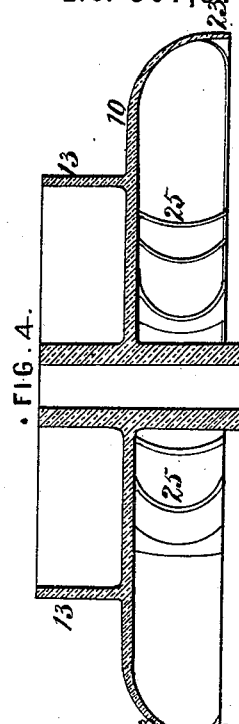
Figure 3:
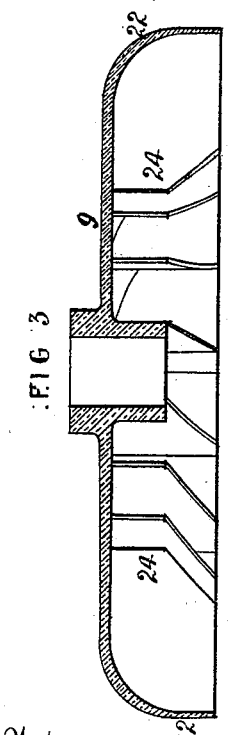
Figure 5:
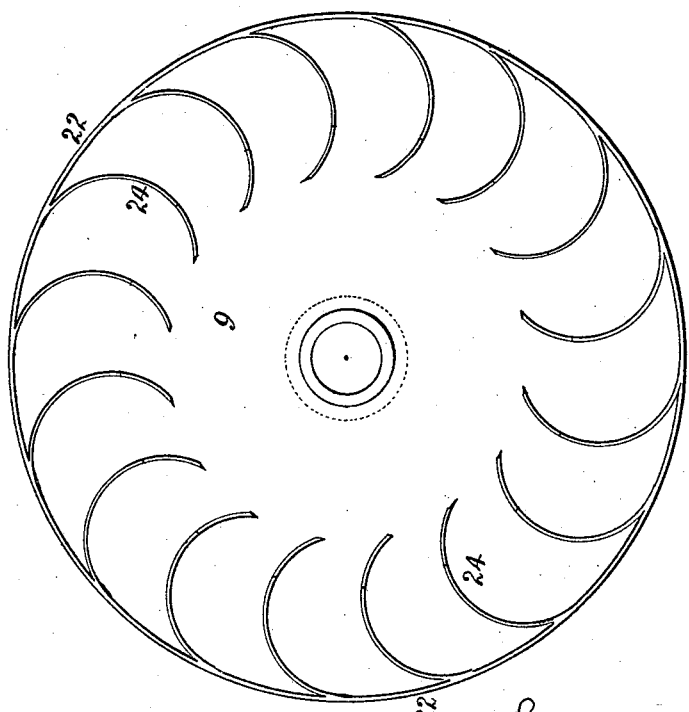

Figure 1 is a plan, and Fig. 2 is a side elevation. Figs. 3 and 4 are sections as at right angles to Figs. 5 and 6, which figures are enlarged face views of the disks.

Figure 6:
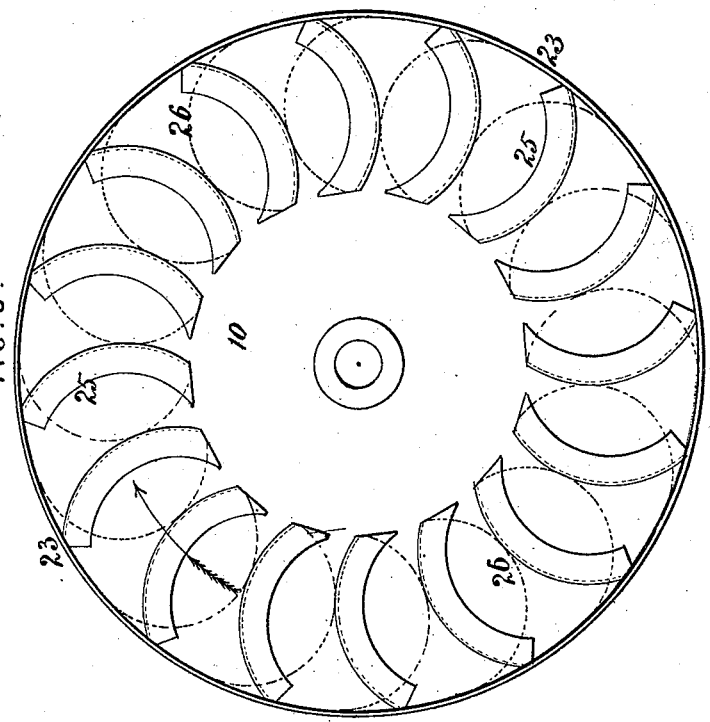

The apparatus comprises a box, 8, which may be of any convenient form, and this box contains the two governor-disks 9 10, immersed in water or other suitable liquid. Both disks 9 10 are carried on a horizontal shaft, 11, which passes out through a stuffing-box in one side of the box 8, and has fast on it externally a pulley, 12, for a driving-belt. One, 9, of the disks is fast on the shaft 11, and the other, 10, is loose thereon, and the loose disk 10 has formed on its outer face a barrel, 13, round which there passes a chain, 14, having one end fixed to the barrel and the other to a lever, 15, centered on the shaft 16. This lever, 15, works the throttle or other regulating-valve, 17, through a lever, 18, keyed onto the same shaft, 16, and connected to the lever 19 of the valve 17 by means of a link, 20. An adjustable weight, 21, is applied to the lever 15 in a manner to tend to turn the loose disk 10 in the opposite direction to that of the rotation of the shaft 11. The disks 9 and 10 are formed with flat faces for some distance from their central bosses, and with curved rims 22 23 at their outer parts, the edges of the rims projecting from the faces of the disks to about the same extent as the blades 24 25, fixed to the inner faces of the disks. These blades 24 25 are represented as of forms which have been arrived at by numerous careful experiments, and they yield extremely satisfactory results, demonstrating that disks of small size are capable of exerting ample power for adjusting large throttle or regulating valves. The forms of the blades 24 25 may, however, be varied to some extent without materially altering the results. The blades 24 of the rotating disk 9 are curved, as seen in face view, with their concavities facing in the direction of rotation; but they are straight in any planes at right angles to the flat part of the disk. The blades 25 of the loose disk 10 are curved, both as seen in face view and in planes at right angles to the flat part of the disk, and their concavities face in the opposite direction to those of the rotating disk 9 when the disks are in position. In Fig. 6 the dotted lines 26 show the position occupied by the rotating blades 24 when the disks 9 10 are placed face to face, and the arrow shows the direction of motion of the rotating disk 9. The disks 9 10 are placed on the shaft 11, so as to be sufficiently clear of each other for no parts to come in contact, even with some unexpected vibration. One-eighth of an inch is believed to be sufficient clearance for disks the extreme diameter of which is seven inches.

The blades 24 25 may be conveniently made from sheet-metal by cutting and stamping processes, and be fixed separately to the disks, or disks may be cast with the blades on them.

What I claim as my invention is—

1. The combination of a liquid-receptacle and two independent rotary disks therein, both having curved rims and blades on adjoining faces, and one disk being adapted to be driven by the engine while the other controls the engine-valve, and a counterpoise for the latter disk, all substantially as set forth.

2. The combination of a liquid-receptacle and two independent rotary disks therein, both having concave blades on adjoining faces, the concavities facing in opposite directions, and one disk being adapted to be driven by the engine while the other controls the valve, and a counterpoise for the latter disk, substantially as described.

In testimony whereof I have signed my name to this specification in the presence of two subscribing witnesses.

ROBERT DAVID NAPIER.

Witnesses:
DAVID FERGUSON,
WILLIAM HASTIE.